US007596913B2

(12) United States Patent
Carew

(10) Patent No.: US 7,596,913 B2

(45) Date of Patent: Oct. 6, 2009

(54) MULTI-PASSAGE GUIDE SYSTEM

(75) Inventor: Gregory T. Carew, Tomahawk, WI (US)

(73) Assignee: J. G. Starew Innovative Solutions, L.L.C, Tomahawk, WI (US)

( * ) Notice: Subject to any disclaimer, the term of this patent is extended or adjusted under 35 U.S.C. 154(b) by 646 days.

(21) Appl. No.: 10/908,414

(22) Filed: May 11, 2005

(65) Prior Publication Data

US 2006/0272242 A1 Dec. 7, 2006

(51) Int. Cl.
*E04C 2/52* (2006.01)

(52) U.S. Cl. .................... 52/220.1; 52/220.3; 52/220.5; 248/65

(58) Field of Classification Search ................ 52/220.1, 52/220.2, 220.3, 220.5; 248/49, 51, 65, 68.1, 248/69, 74.1
See application file for complete search history.

(56) References Cited

U.S. PATENT DOCUMENTS

| | | | | | |
|---|---|---|---|---|---|
| 1,444,057 | A * | 2/1923 | Bosley | 174/97 |
| 1,749,725 | A * | 3/1930 | Uhl et al. | 220/3.4 |
| 2,372,674 | A * | 4/1945 | Jordan | 248/65 |
| 3,870,346 | A | 3/1975 | Kappeler et al. | |
| 4,121,653 | A | 10/1978 | Vinz | |
| 4,244,542 | A * | 1/1981 | Mathews | 248/49 |
| 4,614,838 | A * | 9/1986 | Sandstrom | 174/70 C |
| 4,899,965 | A * | 2/1990 | Usui | 248/68.1 |
| 5,029,817 | A | 7/1991 | Tamm | |
| 5,131,458 | A | 7/1992 | Bourne et al. | |
| 5,249,764 | A * | 10/1993 | Narumi | 248/68.1 |
| D346,546 | S | 5/1994 | Tesmar, Jr. | |
| 5,533,355 | A | 7/1996 | Rawlings | |
| 5,547,152 | A * | 8/1996 | Krock | 248/74.1 |
| 5,587,554 | A * | 12/1996 | Kendrick, Jr. | 174/37 |
| 5,598,682 | A | 2/1997 | Haughian | |
| 5,740,300 | A | 4/1998 | Hodge | |
| 5,819,374 | A | 10/1998 | Chiles et al. | |
| 5,992,802 | A * | 11/1999 | Campbell | 248/68.1 |
| 6,009,612 | A | 1/2000 | Fiedrich et al. | |
| 6,248,952 | B1 | 6/2001 | Reeves et al. | |
| 6,250,591 | B1 * | 6/2001 | Cunningham | 248/65 |
| 6,344,611 | B2 * | 2/2002 | Ewer et al. | 174/488 |
| 6,352,224 | B1 | 3/2002 | Collins | |
| 6,527,302 | B1 * | 3/2003 | Gault et al. | 285/125.1 |
| 6,726,115 | B1 | 4/2004 | Chiles et al. | |
| 2003/0021655 | A1 | 1/2003 | Correll et al. | |
| 2003/0172602 | A1 * | 9/2003 | DeFreitas | 52/220.3 |

FOREIGN PATENT DOCUMENTS

| | | | |
|---|---|---|---|
| JP | 63112027 | A | 5/1988 |
| JP | 04351398 | A | 12/1992 |
| JP | 10141578 | A | 5/1998 |
| JP | 2004245398 | A | 9/2004 |
| WO | WO 2004/018921 | A1 | 3/2004 |

* cited by examiner

*Primary Examiner*—Basil Katcheves
(74) *Attorney, Agent, or Firm*—Ziolkowski Patent Solutions Group, SC

(57) ABSTRACT

A system for arranging a plurality of conductors includes a guide assembly having a plurality of passage guides. Each of the plurality of passage guides are constructed to guide the passage of a conduit through the guide assembly. The guide assembly is securable to a substrate and constructed to organize individual conduits passing therethrough. The individual conduits communicate any one of a fluid, an electrical power, a hydraulic fluid, or the like through the guide assembly.

24 Claims, 4 Drawing Sheets

MULTI-PASSAGE GUIDE SYSTEM

BACKGROUND OF THE INVENTION

The present invention relates generally to guide assemblies and, more particularly, to a guide assembly having multiple passage guides connected thereto.

During construction of residential and commercial facilities, it is often required to pass conductors through the structure of the facility. Such conductors include power cables, water lines, phone cables, and television signal cables. Additionally, with the proliferation of "smart buildings" it has become more desirable and cost efficient to pass computer cables as well as entertainment and security cables within wall, floor, and ceiling cavities. Such systems are often referred to as structured wiring systems and often include a bundled array of phone, computer, co-axial, and speaker cables.

Often, the devices associated with a specific system share a common point of origin. For simplicity, only one such system will be described. In buildings equipped with radiant heat systems, a plurality of radiant heating loops are connected to a manifold and extend about the building. The simplest of radiant heating loops have a first end connected to a hot water inlet, extend about the area to be heated, and have a second end connected to a return manifold thereby forming a "loop". A heating fluid, such as water, is heated by a heat source, such as a water heater or boiler, and is pumped through the heating loop. Such radiant heating loops are frequently located in close proximity to a finish floor of the area to be heated. The heating loops can be positioned beneath a subfloor or sandwiched between a subfloor or substrate, and a finish floor.

To maximize the usable space of a structure, the heating loops often extend generally transverse to the floor surfaces in close proximity to a wall surface. Such an orientation minimizes the space obstructed by the heating tubes. Often, an elbow is employed to facilitate this generally transverse directional change. For radiant heat systems, each end of a loop must be threaded through an elbow. A single loop heating system requires an elbow to be passed over each end of the heating tube. Each elbow must then be securely fastened to a sub-surface to allow a finish floor to be formed thereabout. Individually securing each elbow is a time consuming and tedious process and often delays the construction process. Although there are known elbow constructions that allow the conduit to pass radially into the elbow, these elbows only support individual conductors. That is, often multiple elbows must be individually secured and individual conductors passed therethrough or thereinto. Additionally, depending on the finish floor system formed about the heating tubes, inadvertent movement of the individual elbows can result in damage or displacement of the conductor passed therethrough during formation of the finish floor.

Radiant floor heating has gained increased acceptance as the preferred heating method for spaces built on grade or in basements. The radiant tubes are often attached to a supporting structure and a concrete floor is often poured thereover. The process of finishing a concrete floor often employs the application of a power trowel. The power trowel includes a plurality of individual floats attached to an engine. Operation of the engine rotates the floats and as the power trowel is moved across the surface of the floor, the floats provide a relatively smooth and flat finish of the floor. An operator of the power trowel must be particular careful during finishing of the floor near the array of individual elbows that have been passed thereinto. Although the concrete is generally stiff enough to support the weight of the power trowel and an operator thereof, inadvertent contact between the power trowel and the elbows can result in displacement of the elbows from their secured location. Such an event produces a relatively unsightly finished alignment of the individual elbows and/or a blemish in the finish of the floor. Worse yet, if the floats of the power trowel contact the radiant tube or other conductor passed through the elbow, the float could sever the conductor or minimally form a leak in fluid communicating conductors.

It would therefore be desirable to have a system and method capable of quickly and efficiently guiding and securing a plurality of conductors in such applications.

BRIEF DESCRIPTION OF THE INVENTION

The present invention provides a system and method that solves the aforementioned drawbacks. Specifically, a system for arranging a plurality of conductors includes a guide body having a plurality of passage guides connected thereto. Each of the plurality of passage guides is constructed to direct the passage of an individual conductor therethrough. The guide body is securable to a substrate and constructed to organize the individual conductors connected thereto. The individual conductors communicate any one of a fluid, an electrical power, a hydraulic fluid, or the like through the guide body.

Therefore, in accordance with one aspect of the present invention, a guide assembly is disclosed that has a body having a first surface and a second surface, wherein the first surface is arranged in a first direction and the second surface is arranged in a second direction that extends outwardly from the first direction. The guide assembly also includes a number of passage guides extending through the body, each passage guide having an inlet generally aligned with the first surface of the body and an outlet generally aligned with the second surface. The passage guides are constructed to allow the passage of a plurality of conduits or conductors therethrough between the first surface to the second surface.

According to another aspect of the present invention, a guide system includes a first body, a second body connected to the first body, and a plurality of tubes. The tubes are connected to at least one of the first and second bodies and each tube has a first end facing a first common direction and a second end facing a second common direction, wherein the two directions are other than parallel.

In accordance with a further aspect of the present invention, a guide system includes a method of securing a conduit array that includes the step of securing a guide block to a substrate and securing a first conduit to the block such that the first conduit extends in crossing directions from the guide block. The process also includes securing a second conduit to the guide block such that the second conduit extends in directions generally similar to the first conduit.

According to a further aspect of the present invention, a guide assembly is set forth having a body with first and second portions, wherein the second portion extends from the first portion. A first set of retainers is attached to the first portion of the body in and a second set of retainers is attached to the second portion of the body and is generally aligned with the first set of retainers. The retainers are constructed to retain a plurality of conduits therein.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
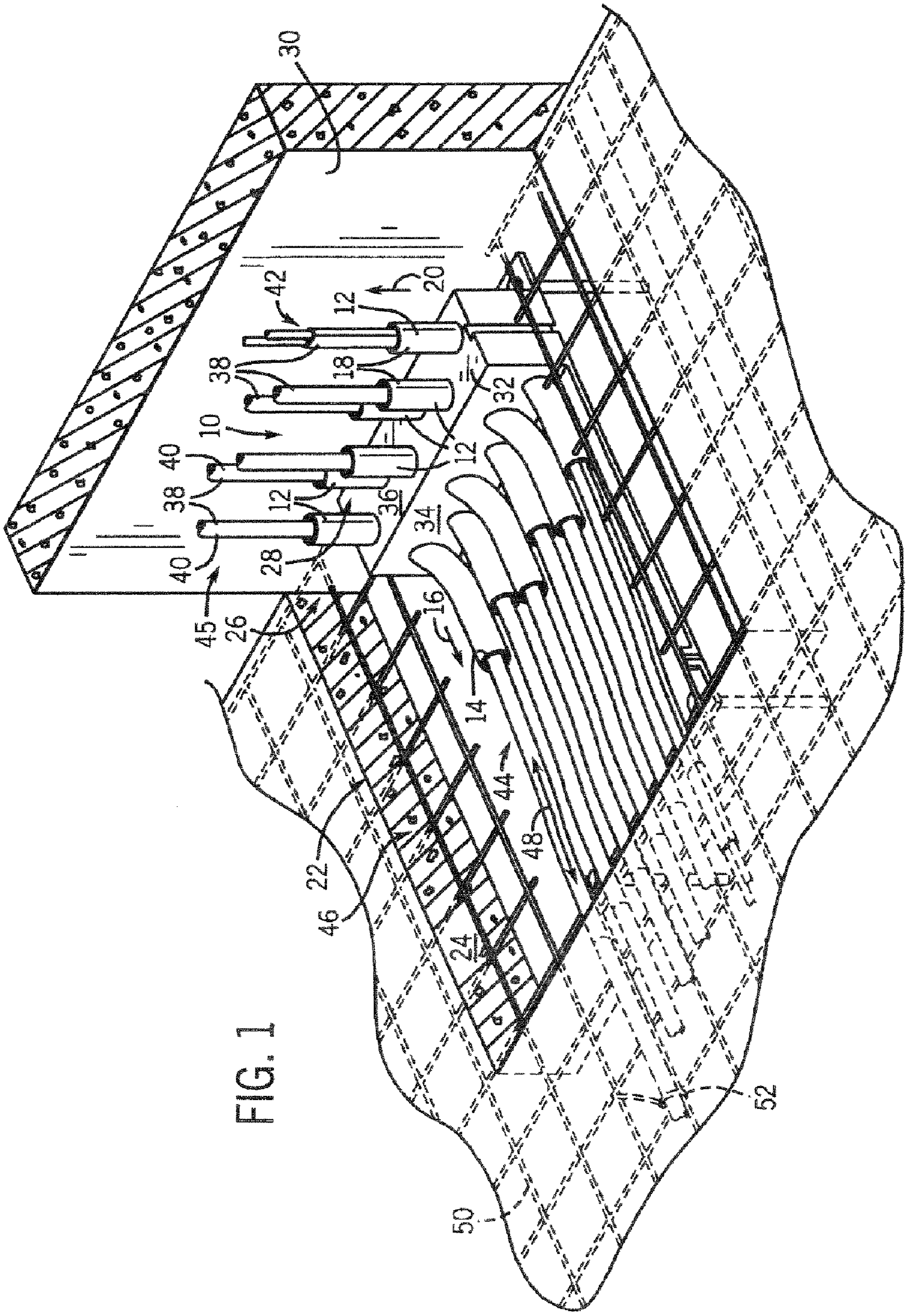
FIG. 1 is a perspective view of one embodiment of a guide assembly according to the present invention secured in a substrate.

FIG. 1 shows one embodiment of a guide assembly 10 according to the present invention. Guide assembly 10 includes a plurality of retainers, or passage guides 12 formed therethrough. Each passage guide 12 includes a first end 14 that extends in a first direction, indicated by arrow 16, and a second end 18 that extends in a second direction, indicated by arrow 20. First direction 16 is oriented to generally align with a floor system 22 and second direction 20 extends outwardly therefrom. Although first direction 16 and second direction 18 are shown as generally transverse to one another, other crossing orientations are envisioned and within the scope of the appending claims. First ends 14 are generally aligned to share a common plane preferably below a finish surface 24 of floor system 22. In one preferred embodiment, the second ends 18 are arranged in two sets. A first set 26 of second ends 18 are generally aligned with, but offset from, a second set 28 of second ends 18. First set 26 and second set 28 of second ends 18 preferably extend along a wall 30 with the first set 26 being further from wall 30 than second set 28.

The plurality of passage guides 12 extend through a body 32 of guide assembly 10 such that each passage extends through body 32 between first end 14 and second end 18. First ends 14 and second ends 18 extend from a first surface 34 and a second surface 36 of body 32, respectively. During installation, first surface 34 is constructed to be positioned within floor system 22 and second surface 36 is oriented to be generally flush or extend above finish surface 24 of floor system 22.

Prior to forming floor system 22 about guide assembly 10, either a plurality of conductors 38 are passed through the plurality of passage guides 12 or the passage guides 12 are connected to conduit means to allow passage of some medium therethrough. Each conductor 38 is isolated from other conductors of the plurality conductors as it passes through an associated passage guide 12 of guide assembly 10. The plurality of conductors 38 are any of a radiant heating tube 40, an electrical cable 42, a computer cable, a potable water tube, a structured wiring cable, a computer cable, a phone cable, or any other conductor that is desired to be passed through floor system 22. A first end 44 of each conductor 38 extends from first end 14 of a respective passage guide 12 and passes through floor system 22. First end 44 of each conductor 38 can exit floor system 22 at a location remote from guide assembly 10 or loop through floor system 22 and return to guide assembly 10 and exit floor system 22 thereat. That is, where conductor 38 is a radiant heating tube 40 connected to a heat source with an intended return site located proximate guide assembly 10, radiant heat tube 40 could enter and exit floor system 22 via guide assembly 10. Comparatively, if conductor 38 is an electrical cable 42 desired to feed a device such as an outlet, electrical cable 42 does not need to exit floor system 22 at guide assembly 10. Similarly, if a return site for radiant heat tube 40 is remote from guide assembly 10, a supplemental guide assembly can be positioned at the desired exit of radiant heat tube 40 and/or electrical cable 42 from floor system 22.

A second end 45 of each conductor 38 extends from second end 18 of a respective passage guide 12 for connection with an associated system. That is, second end 45 of radiant heat tube 40 extends from second end 18 of guide assembly 10 for connection to a heating system whereas second end 45 of electrical cable 42 extends from second end 18 of guide assembly 10 for connection to an electrical device or an electrical panel. Once the desired conductors 38 have been passed through guide assembly 10, floor system 22 is formed thereabout. For concrete flooring systems 46, first ends 44 of plurality of conductors 38 are secured about a length 48 of the conductor 38 to a reinforcing material 50 associated with the concrete flooring system 46. A plurality of ties 52 secure conductors 38 to reinforcing material 50 in a desired location such that conductors 38 remain in the desired location during the process of forming floor system 22 thereabout. Alternatively, conductors 38 could be secured directly to a subfloor, substrate, or graded surface.

Understandably, floor system 22, being a concrete floor system, is merely an exemplary application of guide assembly 10. That is, guide assembly 10 is equally applicable with other flooring systems such as wood/tile/carpet flooring systems. Additionally, the orientation of guide assembly 10 to floor system 22 is also exemplary. That is, as shown in FIG. 1, second ends 18 of guide assembly 10 extend upwardly from finish floor 24. Where passage of conductors 38 through a first floor flooring system is desired, guide assembly 10 is rotatable 180 degrees to allow the conductors that are passed therethrough to extend into a joist cavity below the first floor flooring system. As such, guide assembly 10 is applicable to multiple levels of a building structure and provides an efficient and convenient method of passing multiple conductors into and out of any flooring system.

Figure 2:
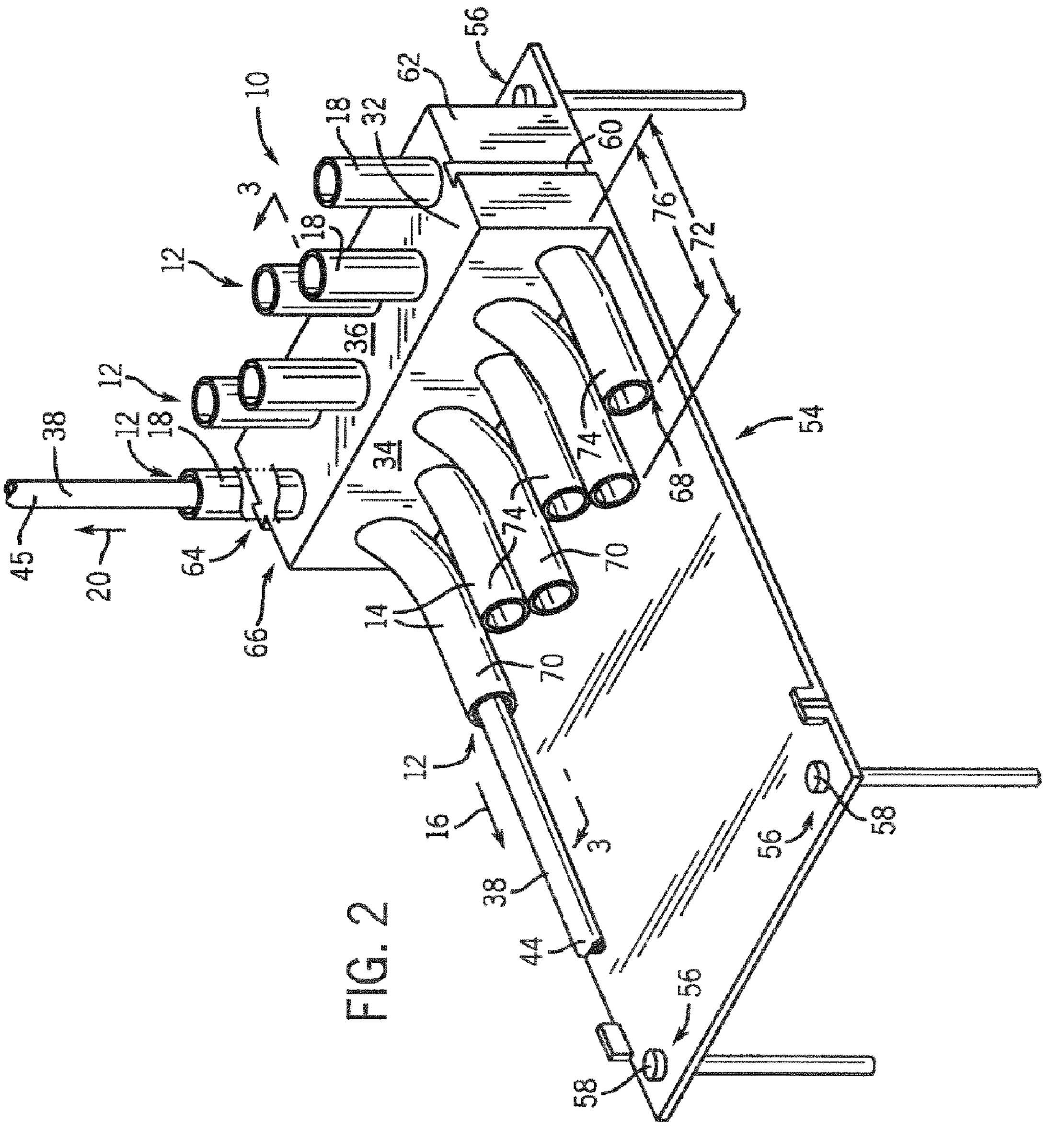
FIG. 2 is a perspective view of the guide assembly shown in FIG. 1.

FIG. 2 shows guide assembly 10 removed from flooring system 22. Body 32 of guide assembly 10 includes a base 54 extending therefrom. Base 54 is constructed to secure guide assembly 10 to a substrate. Base 54 includes a plurality of openings 56 formed therethrough. A plurality of fasteners 58 pass through openings 56 and secure guide assembly 10 to a substrate. As shown in FIG. 2, fasteners 58 are constructed to engage a gravel base disposed beneath a concrete floor system. Understandably, fasteners 58 could be any suitable fastener such as a nail or screw and constructed to secure guide assembly 10 to a sub-floor system of any material. Alternatively, body 32 could include a plurality of fastener openings or tabs connected thereto such that body 32 could be secured to a surface. In another alternate embodiment, the base 54 may be equipped with tabs to engage joists or studs.

Body 32 of guide assembly 10 includes a groove 60 formed in a first lateral end 62 thereof and a rib 64 extending from a second lateral end 66 thereof. Groove 60 and rib 64 each have a triangular cross-sectional shape such that rib 64 slidingly engages a corresponding groove 60 formed in another guide assembly 10. Such a construction allows the connection of a plurality of guide assemblies 10 when more passage guides 12 are desired. Understandably, this dove-tailed engagement between rib 64 and a corresponding groove 60 of another guide assembly 10 is merely exemplary. That is, other configurations such as a circular cross-section or other unique cross-sectional shapes are envisioned and within the scope the claims. Alternatively, lateral ends 62, 66 could have substantially similar cross-sectional shapes. For such a construction, guide assembly 10 would include a connector constructed to engage a respective end of adjacent guide assemblies thereby connecting the adjacent guide assemblies. Similarly, rather than the sliding engagement between multiple guide assemblies, other connection means are envisioned such as mechanical connectors or a snap-fitting engagement between adjacent guide assemblies.

Conductor 38 passes uninterruptedly through passage guides 12 such that first end 44 of conductor 38 extends in first direction 16 along base 54 generally parallel to a floor surface. Second end 45 of conductor 38 extends from second end 18 of passage guide 12 in direction 20 and across first direction 16. Such a construction provides a guide assembly that is robust and resistant to movement during formation of a finish floor system thereabout. Additionally, guide assembly 10 provides an aesthetically pleasing arrangement of conductors 38 as the conductors exit the floor system.

First ends 14 of passage guides 12 share a common plane, indicated by line 68, generally parallel to a floor surface. Such a construction ensures that conductors 38 passed from first ends 14 of guide assembly 10 are a relatively uniform depth in a floor system. For heating type systems, this ensures relatively uniform heating of the floor surface. A first set 70 of first ends 14 are a first distance 72 from first surface 34 of body 32. A second set 74 of first ends 14 are a second distance 76 from first surface 34 of body 32. Such an orientation allows a user to readily distinguish interconnected conductors. That is, for radiant heating loops, each inlet conductor could extend from a passage guide 12 of first set 70 of first ends 14 and a return associated therewith could pass through an adjacent first end 14 of second set 74 of passage guides 12. Such a construction is particularly helpful when multiple users are installing multiple loops. That is, each user can independently determine which passage of the plurality of passage guides 12 is required for a return associated with another users heating loop by visual inspection of the guide assembly. Such a construction becomes particularly helpful when multiple guide assemblies are connected and multiple conductors are simultaneously being passed therethrough.

Figure 3:
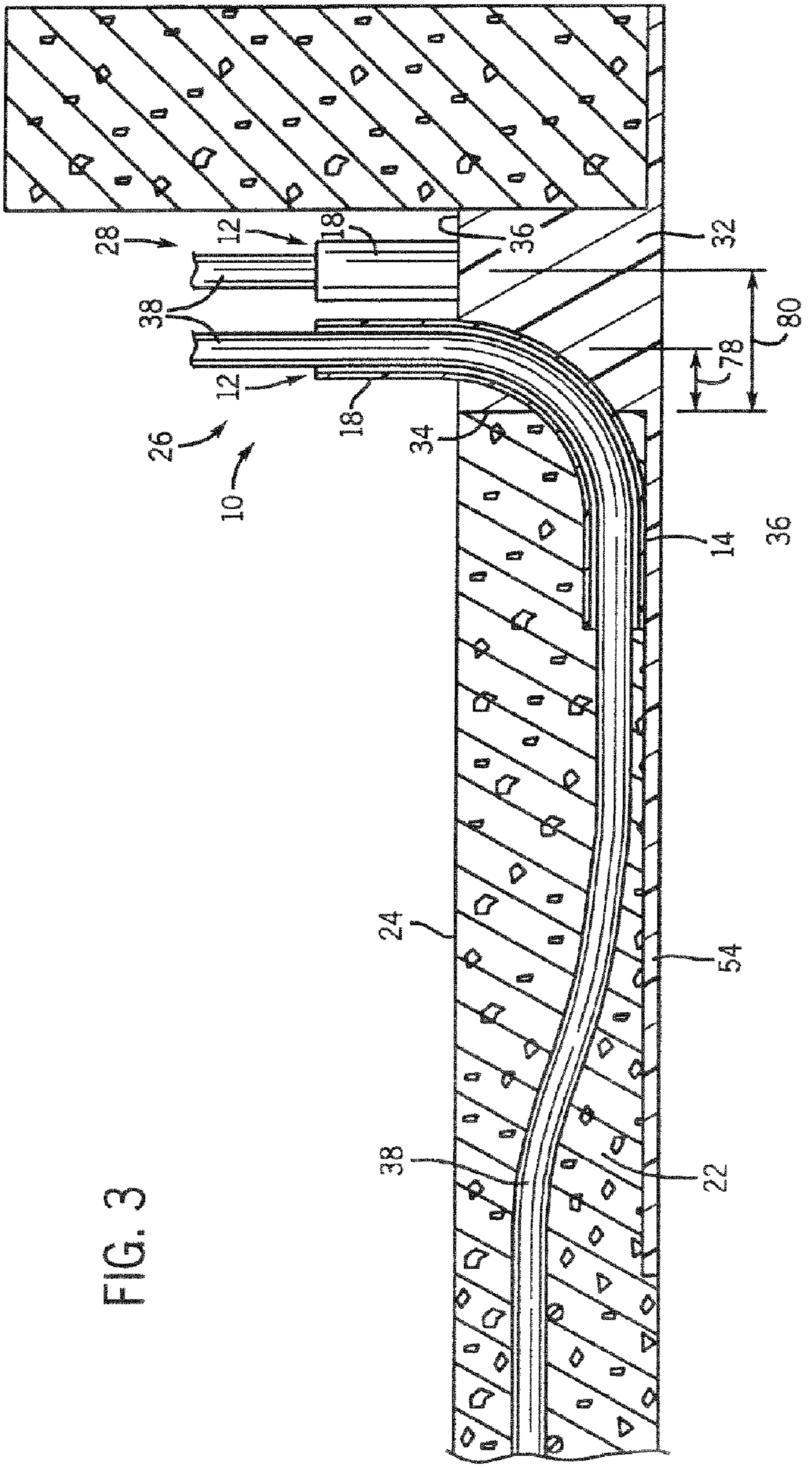
FIG. 3 is a cross-sectional view of the guide assembly along line 3-3 of FIG. 2.

FIG. 3 shows a cross-sectional view of guide assembly 10 along line 3-3 of FIG. 2. As shown in FIG. 3, second ends 18 of guide assembly 10 extend from body 32 outwardly from floor surface 24. Conductors 38 pass through passage guides 12 of guide assembly 10 and enter/exit floor system 22 thereat. Second ends 18 of passage guides 12 extend above second surface 36 of body 32 and prevent inadvertent contact with conductors 38 passed therethrough. Alternatively, second surface 36 could be constructed to extend above floor surface 24 to prevent contact of floor finishing tools with second ends 18 of passage guides 12 as conductors 38 passing therethrough. First set 26 of second ends 18 of passage guides 12 is a distance 78 from first surface 34 of body 32 and second set 28 of second ends 18 of passage guides 12 is another distance 80 from first surface 34. Such a construction allows a user to quickly identify associated conductors after a floor system has been installed. That is, for radiant heating loops, a feed conductor is passed through a passage guide 12 of first set 26 and the associated return is passed through an adjacent passage guide 12 of the second set 28. Understandably, only one of first ends 14 and second ends 18 need be constructed for operative association of conductor loops passed therethrough. Additionally, by offsetting first and second sets 26, 28 of second ends 18, guide assembly 10 provides a compact and visually appealing organization of the plurality of conductors 38 passed therethrough.

Although guide assembly 10 is shown in FIGS. 1-3 as having six passage guides 12 formed therethrough, understandably other numbers of passages are envisioned and within the scope of the claims. That is, guide assembly 10 could be constructed to have any number of passage guides formed therethrough. Additionally, it is understood and within the scope of the claims to provide a guide system having a first guide assembly having a number of passage guides formed therethrough and a second guide assembly having the same or a different number of passage guides formed therethrough. The first and second guide assemblies are connectable to provide a guide system having an application specific number of passage guides. Such a system is highly versatile and limits waste by providing a guide assembly that provides a desired number of passage guides.

Figure 4:
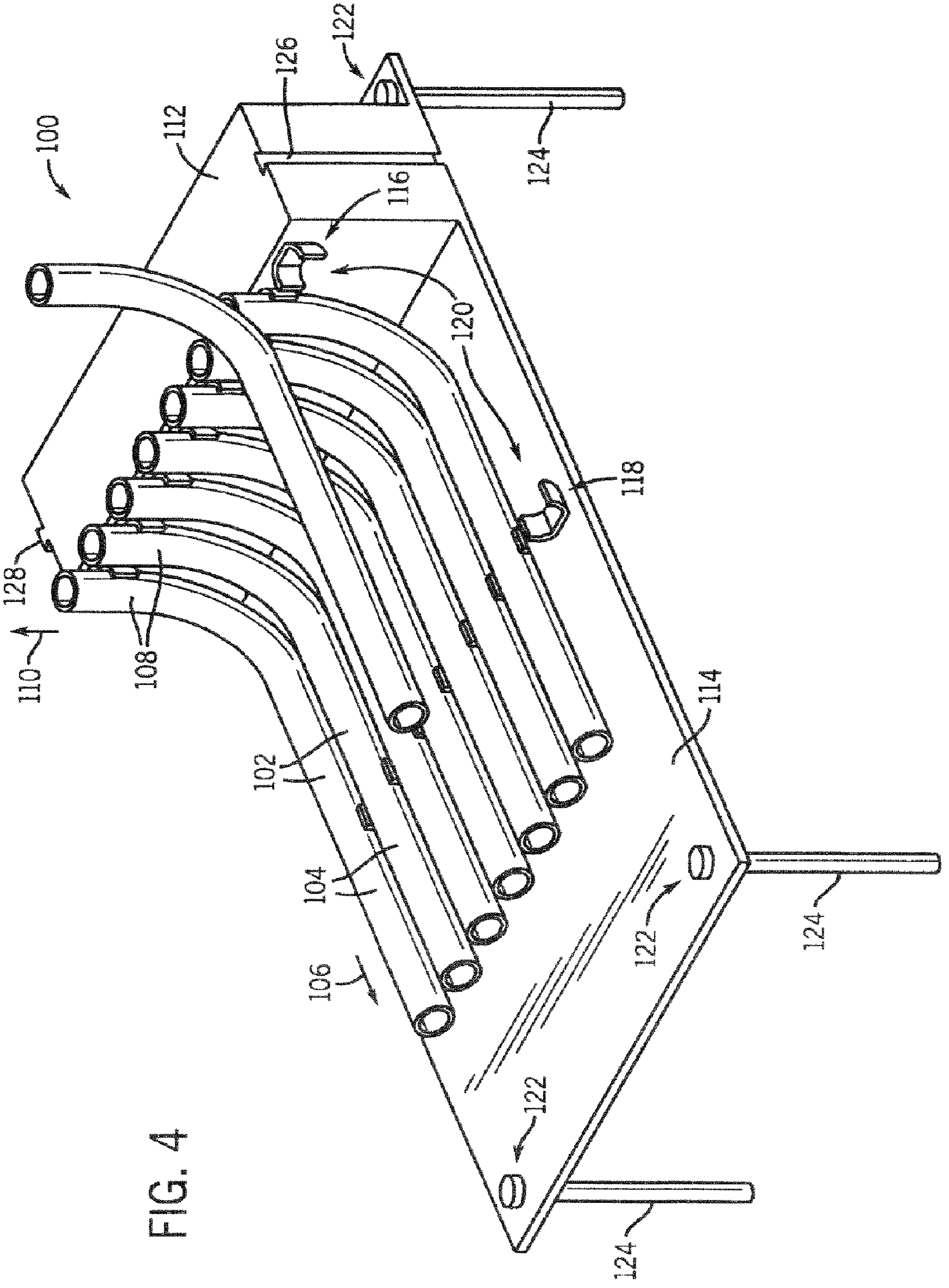
FIG. 4 is a perspective view of another embodiment of a guide assembly according to the present invention.

FIG. 4 shows an alternate embodiment of a guide assembly 100 according to the present invention. Guide assembly 100 includes a plurality of retainers or passage guides 102 removably connectable thereto. Passage guides 102 are generically referred to as elbows and have a first end 104 that extends in a first direction, indicated by arrow 106, and a second end 108 that extends in a second direction, indicated by arrow 110. A body 112 is attached to a base 114 and extends therefrom. A first set of clips 116 are attached to body 112 and a second set of clips 118 are attached to base 114 remote from body 112. Passage guides 102 individually engage an associated clip pair 120 of first set of clips 116 and second set of clips 118. Such a construction allows guide assembly 100 to include no more than a desired number of passage guides 102.

Associated clip pairs 120 engage respective passage guides 102 and secure the position of the passage guide during formation of a floor surface thereabout. Alternatively, it is further understood and within the scope of the claims to construct clip pairs 120 to directly engage a conductor connected to guide assembly 100. That is, each conductor could be attached to guide assembly 100 without passage guides 102. Base 114 includes a plurality of openings 122 formed therethrough. Openings 122 are constructed to allow a fastener 124 to pass therethrough. Fasteners 124 secure guide assembly 100 to a subsurface of the floor formed thereabout. Alternatively, it is understood and within the scope of the claims to form openings 122 through body 112.

Body 112 includes a groove 126 formed therein and a rib 128 extending therefrom. Groove 126 and rib 128 cooperate to allow guide assembly 100 to be securely connected to additional guide assemblies 100. Such a construction provides a guide assembly that is highly versatile and has only a desired number of passage guides or conductors connected thereto. Similar to passage guides 12 of guide assembly 10, passage guides 102 of guide assembly 100 are constructed to allow any one of a plurality of different types of conductors to pass therethrough. That is, passage guides 102 are constructed to allow uninterrupted guided passage of radiant heat tubes, potable water tubes, electrical cables, computer cables, structured wiring cable bundles, or the like, through guide assembly 100. Such a guide system provides a highly versatile, relatively rugged, and visually appealing orientation of the plurality of individual conductors directed by guide assembly 100.

The guide assemblies 10, 100 provide a compact and versatile guide assembly. The guide assemblies include a plurality passage guides and are quickly and efficiently attachable to additional guide assemblies. Such a construction provides a multi-passage guide system that can be quickly adapted to provide a desired number of passage guides. Additionally, the structure of guide assemblies 10, 100 allows the guide assembly to be quickly and securely attached to a sub-floor surface thereby preventing movement of the guide assembly during formation of a floor thereabout. Guide assemblies 10, 100 provide a compact and esthetically pleasing organization for a plurality of conductors desired to pass through a floor system.

Therefore, one embodiment of the present invention includes a guide assembly that has a body having a first surface and a second surface, wherein the first surface is arranged in a first direction and the second surface is arranged in a second direction that extends outwardly from the first direction. The guide assembly also includes a number of passage guides extending through the body, each passage guide having an inlet generally aligned with the first surface of the body and an outlet generally aligned with the second surface. The passage guides are constructed to allow the passage of a plurality of conduits or conductors therethrough between the first surface to the second surface.

Another embodiment of the present invention includes a guide system includes a first body, a second body connected to the first body, and a plurality of tubes. The tubes are connected to at least one of the first and second bodies and each tube has a first end facing a first common direction and a second end facing a second common direction, wherein the two directions are other than parallel.

A further embodiment of the present invention includes a method of securing a conduit array that includes the step of securing a guide block to a substrate and securing a first conduit to the block such that the first conduit extends in crossing directions from the guide block. The process also includes securing a second conduit to the guide block such that the second conduit extends in directions generally similar to the first conduit.

Yet another embodiment of the present invention includes a guide assembly having a body with first and second portions, wherein the second portion extends from the first portion. A first set of retainers is attached to the first portion of the body in and a second set of retainers is attached to the second portion of the body and is generally aligned with the first set of retainers. The retainers are constructed to retain a plurality of conduits therein.

The present invention has been described in terms of the preferred embodiment, and it is recognized that equivalents, alternatives, and modifications, aside from those expressly stated, are possible and within the scope of the appending claims.

What is claimed is:

1. A guide assembly comprising:

a body having a first surface and a second surface, the first surface arranged in a first direction and the second surface arranged in a second direction extending substantially perpendicular to the first direction;

a plurality of passage guides extending through the body in a common direction, each passage guide having an inlet generally aligned with the first surface of the body and an outlet generally aligned with the second surface to form a plurality of corner passages, and constructed to guide the passage of a plurality of conductors therethrough between the first surface to the second surface, the plurality of corner passages thereby guiding each conductor in a direction substantially transverse to the inlet; and another body slidingly engaged to the body and having a plurality of passage guides formed therethrough to form a system of interconnecting guide assemblies.

2. The guide assembly of claim 1 wherein the passage guides of the another body are generally aligned with the plurality of passage guides of the body when attached thereto.

3. The guide assembly of claim 1 further comprising a groove formed in the body and constructed to slidingly engage a rib extending from another body and secure the another body to the body.

4. The guide assembly of claim 3 wherein the rib and the groove have a cross-section having at least one of a triangular-shape, a circular-shape, and a dovetail-shape.

5. The guide assembly of claim 1 wherein each inlet of the plurality of passage guides is generally coplanar and each outlet of the plurality of passage guides is coplanar with at least one of a first set of outlets and a second set of outlets.

6. The guide assembly of claim 1 wherein each conductor of the plurality of conductors is further defined as at least one of a radiant heat tube, a potable water tube, an electrical cable, a co-axial cable, a computer cable, and a structured wiring cable.

7. The guide assembly of claim 1 further comprising a mount extending from the body and constructed to secure the body to a substrate.

8. A guide system comprising: a first body; a second body connectable to the first body; a plurality of tubes passing through at least one of the first and second body, each tube entering an inlet end of at least one of the first body and second body facing a first common direction and exiting an outlet end of at least one of the first body and second body facing a second common direction, the second common direction not aligned with the first common direction, wherein the first body further comprises a recess formed on a lateral side therein and the second body further comprises a protrusion extending on a lateral side therefrom, the protrusion constructed to slidingly engage the recess and secure the first body to the second body.

9. The guide system of claim 8 further comprising at least one fastener constructed to pass through at least one of the first body and the second body and secure the at least one of the first body and the second body to a substrate.

10. The system of claim 9 further comprising a base plate having at least one opening therethrough and extending from at least one of the first body and second body, the at least one opening constructed to allow a portion of the at least one fastener to pass therethrough.

11. The system of claim 8 further comprising a coupler constructed to engage an end of the first body and an end of the second body, the ends of the first body and the second body having a common cross-section and constructed to snap-fittingly engage the coupler.

12. The system of claim 8 wherein the plurality of tubes pass through the at least one of the first body and the second body and are constructed to guide a conductor therethrough such that the conductor extends in the first common direction and the second common direction from the at least of first body and the second body.

13. The system of claim 8 wherein the inlet end of each of the plurality of tubes extends beyond the body in the first common direction and the outlet end of each of the plurality of tubes extends beyond the body in the second common direction.

14. The system of claim 8 wherein the first body has a number of tubes different than a number of tubes of the second body.

15. A method of securing a conduit array comprising the steps of: securing a guide block to a substrate; securing a first conduit to the guide block such that the first conduit enters the guide block on a first side and exits the guide block on a second side, wherein the first side and second side of the guide block are two transverse, non-aligned sides of the guide block; securing a second conduit to the guide block such that the second conduit enters and exits the guide block in directions generally similar to the first conduit; and securing another guide block to a lateral side of the guide block, wherein the another guide block is slidingly engaged with the guide block.

16. The method of claim 15 wherein at least one of the steps of securing the first conduit and securing the second conduit further comprises passing the at least one of the first conduit and the second conduit through a guide passage formed through the guide block.

17. The method of claim 15 wherein at least one of the steps of securing the first conduit and securing the second conduit further comprises the step of engaging the at least one of the first conduit and the second conduit with at least one clip attached to the guide block.

18. The method of claim 15 wherein at least one of the steps of securing the first conduit and securing the second conduit further comprises the step of passing the at least one of the first conduit and the second conduit through an elbow and the step of securing the at least elbow to the guide block.

19. The method of claim 18 wherein the step of securing the elbow to the guide block further comprises snap-fittingly engaging the elbow with at least one clip attached to the guide block.

20. The method of claim 15 further comprising attaching at least one of the first conduit and the second conduit to at least one of an electrical system, a hydronic system, a potable water system, a structured wiring system, and a hydraulic system.

21. A guide assembly comprising:

a body having a first portion and a second portion, the second portion extending in a direction substantially transverse to the first portion, a vertical groove formed on a first lateral side, and a vertical rib formed on a second lateral side;

a first set of retainers attached to the first portion of the body;

a second set of retainers attached to the second portion of the body and generally aligned with the first set of retainers; and wherein the retainers are constructed to retain a plurality of conduits therein, the conduits each forming a substantially perpendicular passage therethrough.

22. The guide assembly of claim 21 further comprising a plurality of elbows, each elbow constructed to snap-fittingly engage a retainer of the first set of retainers and another retainer of the second set of retainers.

23. The guide assembly of claim 21 further comprising a plurality of openings formed in the body and constructed to pass a fastener therethrough.

24. The guide assembly of claim 21 further comprising another body connectable to one of the vertical groove and the vertical rib of the body, the another body having a first set of clips and a second set of clips connected thereto, at least one of the first set of clips and the second set of clips generally aligned with at least one the first set of retainers and the second set of retainers when the another body is connected to the body.

* * * * *

UNITED STATES PATENT AND TRADEMARK OFFICE

CERTIFICATE OF CORRECTION

PATENT NO. : 7,596,913 B2
APPLICATION NO. : 10/908414
DATED : October 6, 2009
INVENTOR(S) : Gregory T. Carew It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this

Twenty-eighth Day of September, 2010

David J. Kappos

David J. Kappos
*Director of the United States Patent and Trademark Office*